US010024028B2

(12) United States Patent
Flores et al.

(10) Patent No.: US 10,024,028 B2
(45) Date of Patent: Jul. 17, 2018

(54) METHOD FOR REPAIRING BUCKETS

(71) Applicant: Minetec S.A., Santiago (CL)

(72) Inventors: Antonio Flores, Santiago (CL);
Claudio Zamorano, Santiago (CL);
Bernardo Vera, Santiago (CL)

(73) Assignee: Minetec S.A., Santiago (CL)

( * ) Notice: Subject to any disclaimer, the term of this patent is extended or adjusted under 35 U.S.C. 154(b) by 129 days.

(21) Appl. No.: 15/140,040

(22) Filed: Apr. 27, 2016

(65) Prior Publication Data

US 2017/0204587 A1    Jul. 20, 2017

(30) Foreign Application Priority Data

Jan. 20, 2016 (CL) .................................. 0149-2016

(51) Int. Cl.
*B23P 6/00* (2006.01)
*E02F 3/407* (2006.01)
*E02F 3/60* (2006.01)

(52) U.S. Cl.
CPC .............. *E02F 3/4075* (2013.01); *B23P 6/00* (2013.01); *E02F 3/60* (2013.01); *Y10T 29/4973* (2015.01); *Y10T 29/49721* (2015.01); *Y10T 29/49737* (2015.01); *Y10T 29/49742* (2015.01); *Y10T 29/49789* (2015.01)

(58) Field of Classification Search
CPC ................. B23P 6/00; Y10T 29/49742; Y10T 29/49737; Y10T 29/4973; Y10T 29/49721; Y10T 29/49789; E02F 3/4075; E02F 3/60
See application file for complete search history.

(56) References Cited

U.S. PATENT DOCUMENTS 8,572,870 B2 * 11/2013 Kudo ........................ E02F 3/60
                                                                    37/444

* cited by examiner

*Primary Examiner* — Jermie Cozart
(74) *Attorney, Agent, or Firm* — Hoffman Warnick LLC

(57) ABSTRACT

A method for repairing a bucket of a piece of earthwork equipment is provided, the method being specifically applicable to the repair of electric shovel buckets.

3 Claims, 7 Drawing Sheets

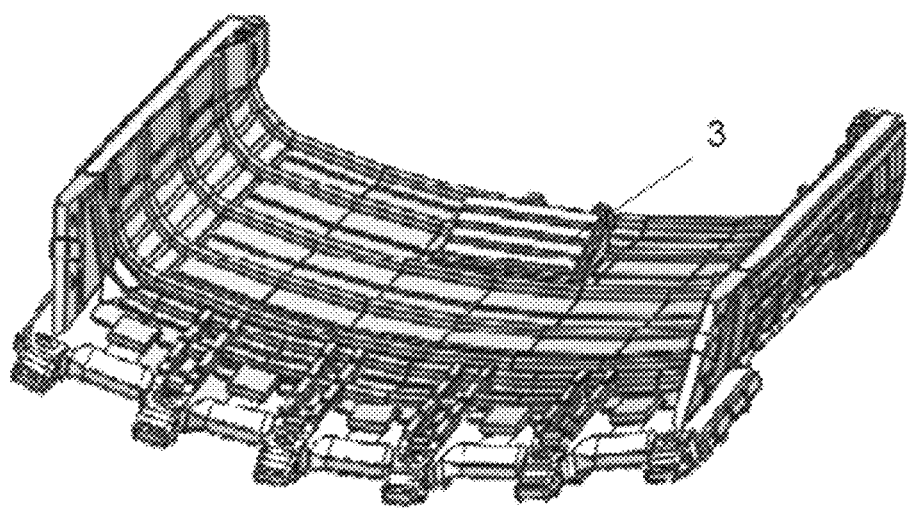
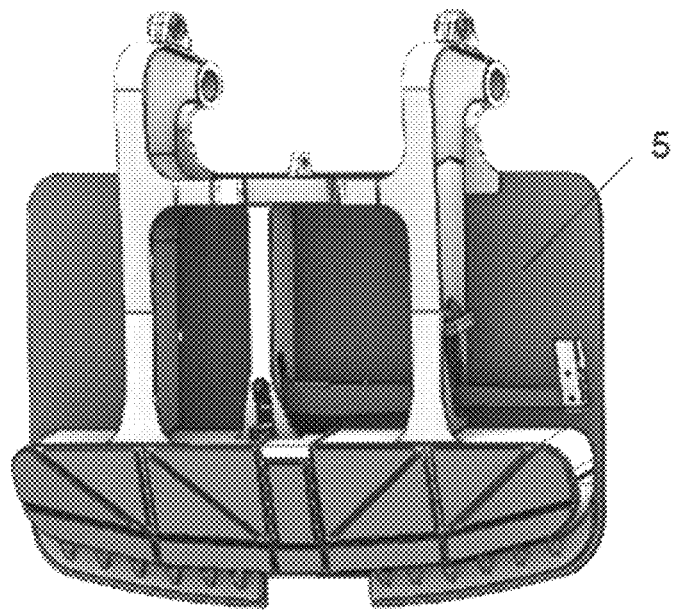
Figure 5

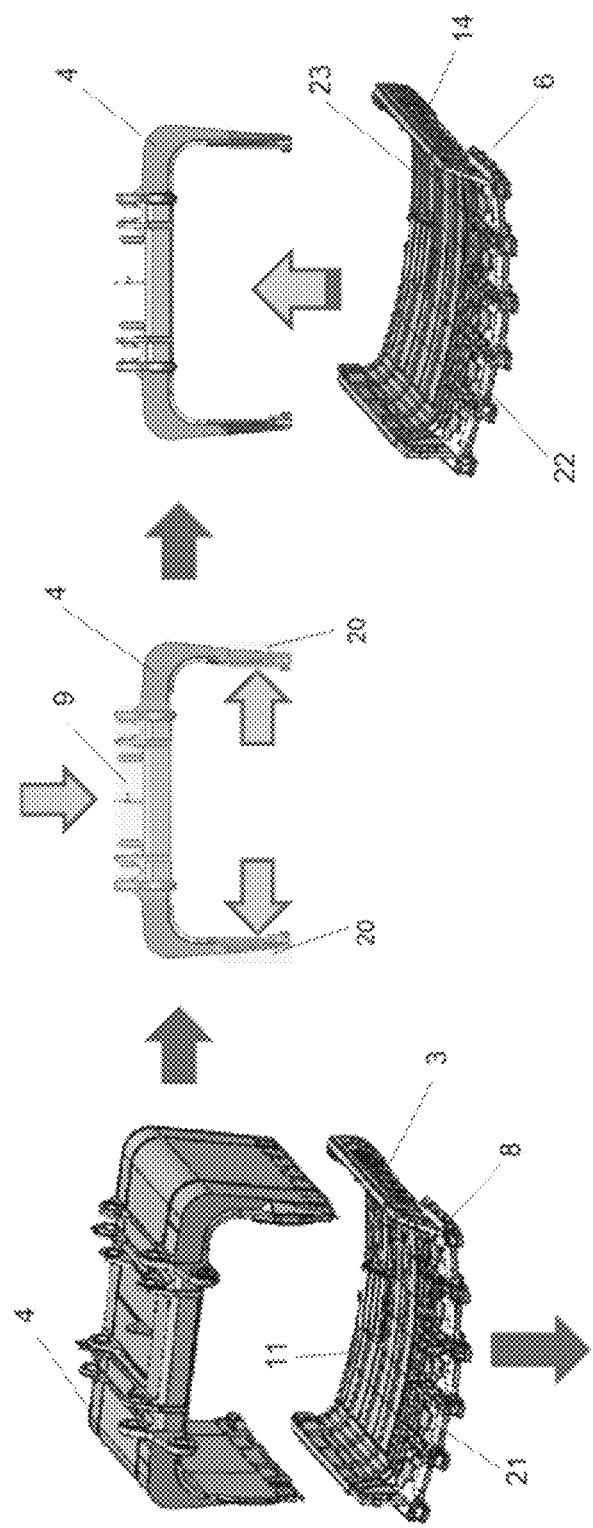

METHOD FOR REPAIRING BUCKETS

CROSS-REFERENCE TO RELATED APPLICATIONS

This application claims the benefit of co-pending Chilean Patent Application No. CL 0149-2016, filed 20 Jan. 2016, which is hereby incorporated herein as though fully set forth.

TECHNICAL FIELD

The technical field of the invention is developed in the area of earthwork equipment maintenance, it specifically relates to a method to repair electric shovel buckets, which saves time in the maintenance operation and therefore reduces equipment downtimes.

DESCRIPTION OF THE PRIOR ART

In the prior art, the door comes disassembled from the bucket and is transported separately as shown in FIG. 1A, each of these components follows a separate maintenance line.
Firstly, once disassembled and transported to the workshop, the door is repaired on both sides, on its inner side and its outer side (see FIG. 2) where:
  All damaged or worn elements are repaired on their inner side and the area of connection of the door with the bucket (FIG. 2A).
  The door is rotated 180 degrees to repair damaged or worn elements (FIG. 2B).
It is estimated that this step required 3 welders, one boiler operator and one assistant/operator, and 25 working days.
Secondly, the bucket itself is repaired considering the following:
  As shown in FIG. 3, the bucket position is changed 4 times.
  First position (FIG. 3A), repair of inner and outer area, according to practice it requires 5 welders for 23 days, 1 boiler operator for 7 days, and 1 assistant for 23 days.
  Second position (FIG. 3B), front door is raised and outer sides and lip are repaired, according to practice it requires 5 welders for 10 days, 1 boiler operator for 7 days, and 1 assistant for 10 days.
  The bucket is rotated 180 degrees (FIG. 3C) and the outer floor is repaired, for which it requires 3 welders for 15 days, one boiler operator for 7 days, and 1 assistant for 15 days.
  The bucket is rotated again 180 degrees (FIG. 3D) and the connection area is repaired, it requires 3 welders for 10 days, 3 turners for 7 days, and 1 assistant for 10 days.
According to the above, it is estimated that repairing the bucket requires 5 welders, 1 boiler operator, 1 assistant and 3 turners, and a total of 58 working days.

SUMMARY OF THE INVENTION

The invention discloses a method to repair electric shovel buckets, which reduces repair times.
The method of the proposed invention reduces the use of cast components, replacing them by laminated components that deliver benefits at the technical-operational level, because they generate high toughness and high resistance to efforts in these components, and a better availability of equipment facilitating replacement.
The bucket to be repaired is cut in two, replacing the lower part by a new one or one previously repaired with laminated components, maintaining and repairing the upper part, and also the door is replaced by a new one or repaired with new laminated instead of molten parts, producing a noticeable reduction in the bucket repair times, which maximizes the equipment operation.
With the use of laminated components, homogeneity of materials is also obtained, thus reducing stress points and achieving a reduction in the overall weight, obtaining a better performance of the component and a reduction in the frequency of maintenance.

BRIEF DESCRIPTION OF THE DRAWINGS

FIG. 5 shows the new door and the lower part of the new bucket which are not repaired and removed from stock once repaired.
FIG. 10A shows the separation of used parts.
FIG. 10B shows the repair of the used upper part.
FIG. 10C shows the attachment of the repaired upper part with the previously repaired lower part.

DETAILED DESCRIPTION OF THE INVENTION

Figure 1A:
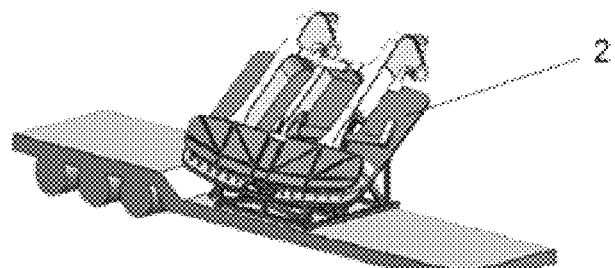
FIG. 1A shows the arrival of a door for maintenance task.
Figure 1B:
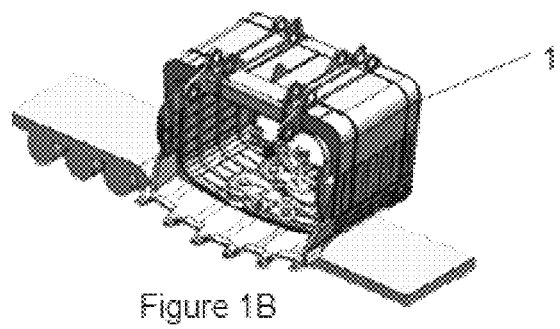
FIG. 1B shows the arrival of a bucket with the door disassembled for maintenance.
Figure 2A:
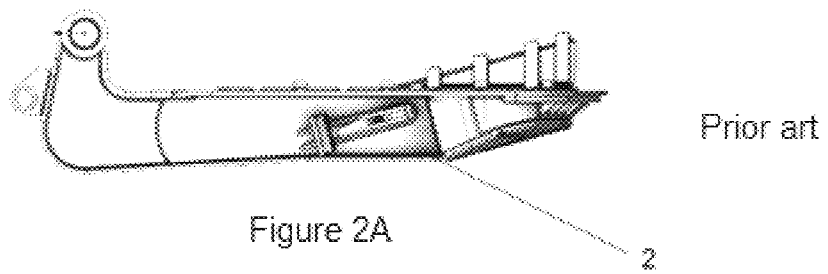
FIG. 2A shows the door once unloaded from the truck in a first position to repair its inner part (upper area).
Figure 2B:
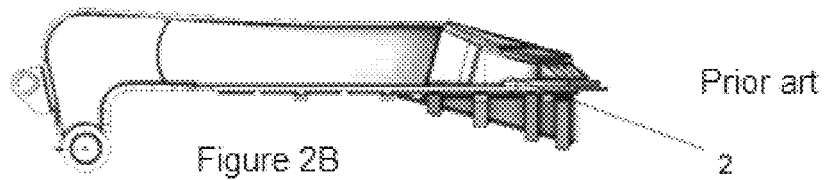
FIG. 2B shows the door once unloaded from the truck in a second inverted position to repair the outer part (upper area).
Figure 3A:
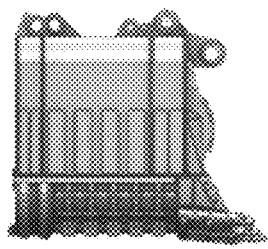
FIG. 3A shows a first position to repair the inner and outer areas of the bucket.
Figure 3B:
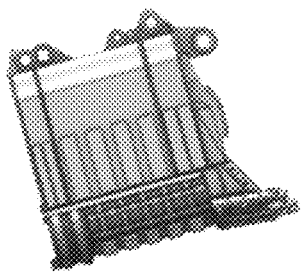
FIG. 3B shows a second position to repair the external sides and lip of the bucket.
Figure 3C:
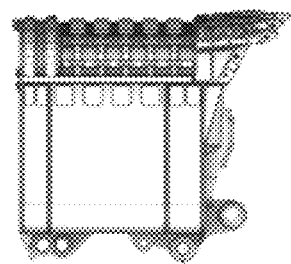
FIG. 3C shows a third position in which the bucket is reversed to repair the outer floor.
Figure 3D:
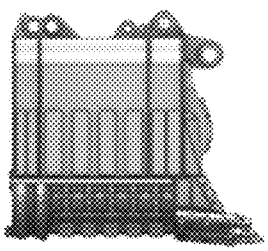
FIG. 3D shows a new reversion of the bucket to repair the connection area.
Figure 4:
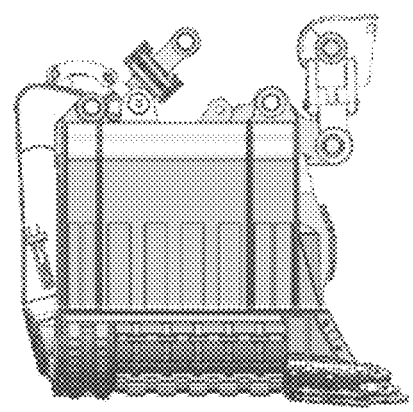
FIG. 4 shows a finished bucket for the process with all its accessories.
Figure 6:
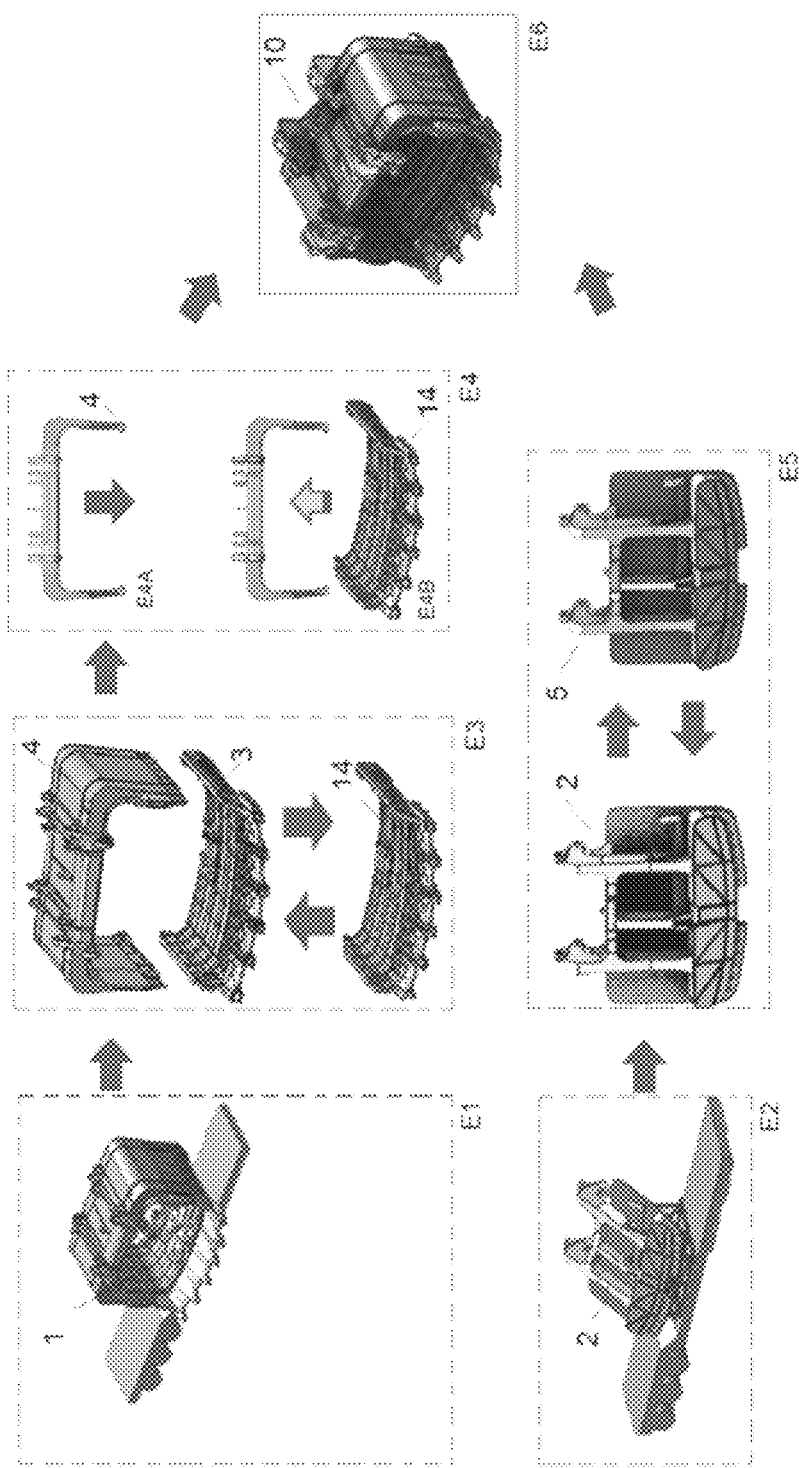
FIG. 6 shows the steps of the invention.
Figure 7:
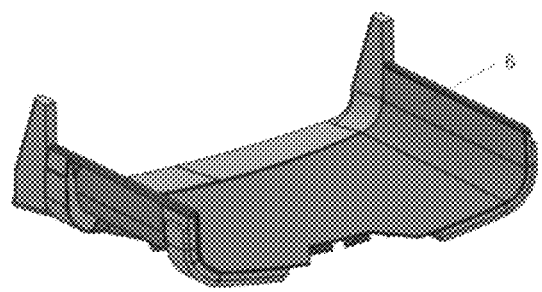
FIG. 7 shows a lower part unshielded.
Figure 8:
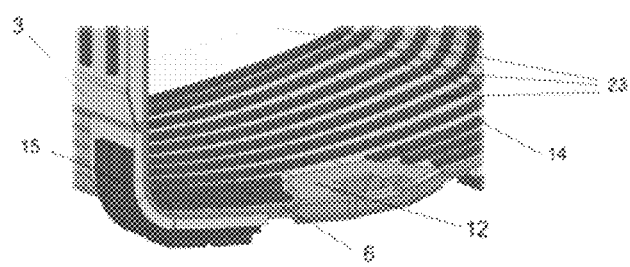
FIG. 8 shows the elements changed on the lower part.
Figure 9:
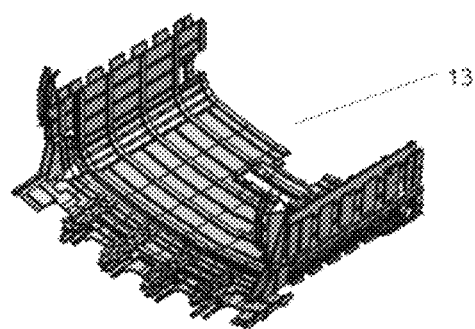
FIG. 9 shows the shield applied to the lower part.
Figures 11A, 11B:
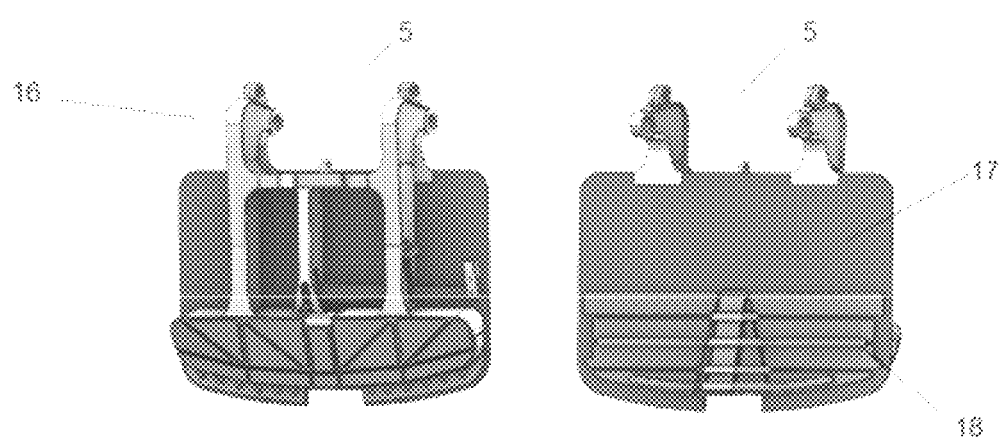
FIG. 11A shows the outer part of the lid.
FIG. 11B shows the inner part of the lid.

A method is detailed to repair a bucket for electric shovel. As shown in FIG. 6, the bucket (1) and the door (2) arrive separately to be repaired (E1, E2).
The method of the proposed invention comprises the steps of:
  (E3) The bucket (1) is cut by separating it into two parts, an upper part (4) which is maintained and repaired, and a lower part (3), which is removed replacing it after completion of repairs to the upper part (4) by a new lower part (14).
  (E4A) Repairs are made on the upper part (4) which has been maintained and once said repairs are finished (E4B) the upper part (4) is welded to the new lower part (14).
  (E5) The original door (2) is removed and replaced by a new door or one previously repaired (5) which is kept in stock.

(E6) Accessory parts and the new door (5) are mounted and corresponding tests are done to obtain a new reconditioned bucket (10).

According to the above, it is estimated that repairing the bucket requires 4 welders, one boiler operator, one assistant and 3 turners, and a total of 24 working days.

As shown in FIGS. 7, 8, 9 and 10, operations are performed both on the upper part (4) which is maintained, as well as on the two removed elements, that is, the original lower part (3) and the original door (2), it should be noted that repair of these two removed elements (3, 2) does not generate operation times in the bucket reconditioning, since these removed elements (3, 2) are repaired outside the bucket repair line and kept in stock once repaired. The operation performed in more detail are:

1) On the upper part (4) maintained, repairs are made in the damaged areas (20) and in the connection area (9).
2) On the original lower part (3) removed used to be kept in stock as a new lower part (14), the following repairs are made to obtain a new lower part (14):

Changing the original floor (8), or part of it, which is usually melted by a new floor (6), or part of it, made of laminated steel.

Changing the original bead band which is usually melted by a new bead band (15) made of laminated steel.

Changing the original flow stoppers (11) usually melted and of high cost by new flow stoppers (23) formed by anti-abrasive steel straps.

If the lip is damaged, changing the original lip (21) melted by a new laminated lip (22) or repairing the original.

Running tests on compatibility and correcting positioning of the cutting or attack tools in the new installed lip or the repaired lip.

Installing a shield (13) formed of a plurality of parts made of anti-abrasive steel.

Changing the original latch eye by a new laminated latch eye (12) if it is damaged, otherwise the original is repaired.

3) In the original door (2) removed and to keep in stock as a new door (5), the following repairs are done to obtain a new door (5):

Installing a new base plate (17) and making repairs in the connection area (16) using high-strength structural steel.

Installing shielding sheets and slabs (18) made of anti-abrasive steel.

The invention claimed is:

1. A method to repair an electric shovel bucket which saves time in maintenance operations comprising the steps of:

cutting the bucket into two parts, an upper part which is maintained, and an original lower part which is removed and replaced by a new lower part after completion of repairs on the upper part;

making repairs on upper part which has been maintained and that includes repairing damaged areas and a connection area and after completion of said repairs welding the upper part to the new lower part;

replacing an original door with a new door or a door previously repaired;

mounting accessory parts and the new door or the door previously repaired and running corresponding tests to obtain a new reconditioned bucket; and making repairs outside a bucket repair line with the original door and the original lower part that have been removed.

2. The method of claim 1, wherein making repairs outside the bucket repair line includes, on the lower part:

changing at least part of an original floor with a new floor made of laminated steel;

changing an original beadband with a new beadband made of laminated steel;

changing an original flow stopper with new flow stopper formed by anti-abrasive steel straps;

changing an original lip with a new laminated lip or repairing the original lip;

installing a shield formed by a plurality of anti-abrasive steel parts; and changing an original latch eye with a new laminated latch eye if it is damaged.

3. The method of claim 1, wherein making repairs outside the bucket repair line includes, in the original door:

installing a new base plate and making repairs in the connection area using high-strength structural steel; and installing shielding sheets and slabs made of anti-abrasive steel.

* * * * *